United States Patent
Itigin et al.

(10) Patent No.: US 10,999,364 B1
(45) Date of Patent: May 4, 2021

(54) EMULATION OF MEMORY ACCESS TRANSPORT SERVICES

(71) Applicant: MELLANOX TECHNOLOGIES, LTD., Yokneam (IL)

(72) Inventors: Yossef Itigin, Hod Hasharon (IL); Aviv Barnea, Beerotaim (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/067,693

(22) Filed: Oct. 11, 2020

(51) Int. Cl.
  *G06F 15/16* (2006.01)
  *H04L 29/08* (2006.01)
  *G06F 15/173* (2006.01)

(52) U.S. Cl.
  CPC ...... *H04L 67/104* (2013.01); *G06F 15/17331* (2013.01); *H04L 67/141* (2013.01); *H04L 69/321* (2013.01); *H04L 69/326* (2013.01)

(58) Field of Classification Search
  CPC ... H04L 67/104; H04L 67/141; H04L 69/321; H04L 69/326; G06F 15/17331
  USPC .................................................. 709/203, 216
  See application file for complete search history.

(56) References Cited

U.S. PATENT DOCUMENTS

| | | | |
|---|---|---|---|
| 7,593,996 B2 | 9/2009 | Gole et al. | |
| 8,761,189 B2 * | 6/2014 | Shachar | H04L 47/10 370/419 |
| 2006/0075057 A1 * | 4/2006 | Gildea | H04L 67/18 709/212 |
| 2007/0208820 A1 * | 9/2007 | Makhervaks | H04L 67/10 709/212 |
| 2011/0116512 A1 * | 5/2011 | Crupnicoff | H04L 67/14 370/463 |
| 2017/0187629 A1 * | 6/2017 | Shalev | H04L 69/10 |
| 2017/0187846 A1 * | 6/2017 | Shalev | G06F 15/17331 |

OTHER PUBLICATIONS

Mellanox Technologies, "RDMA Aware Networks Programming User Manual", Rev. 1.7, pp. 1-216, year 2015.
InfiniBand, "Supplement to InfiniBandTM Architecture Specification vol. 1.2.1; Annex A14: Extended Reliable Connected (XRC) Transport Service", pp. 1-43, revision 1.0, Mar. 2009.
Hilland et al., "RDMA Protocol Verbs Specification", Version 1.0, pp. 1-243, Apr. 2003.

* cited by examiner

*Primary Examiner* — Duyen M Doan
(74) *Attorney, Agent, or Firm* — Kligler & Associates Patent Attorneys Ltd

(57) ABSTRACT

An apparatus includes a network interface and circuitry. The network interface is configured to connect to a communication network. The circuitry is configured to receive, from a host, first RDMA requests in accordance with a first transport service type, for transferring data between an initiator process running on the host and one or more responder processes running on one or more remote computers, to convert the first RDMA requests into second RDMA requests in accordance with a second transport service type, different from the first transport service type, to communicate messages corresponding to the second transport service type with the remote computers, to convert completions, which are received from the one or more remote computers in accordance with the second transport service type, into corresponding completions to the first RDMA requests in accordance with the first transport service type, and to send the corresponding completions to the initiator process.

22 Claims, 4 Drawing Sheets

US 10,999,364 B1

EMULATION OF MEMORY ACCESS TRANSPORT SERVICES

FIELD OF THE INVENTION

The present invention relates generally to computer networks, and specifically to process-to-process communication over computer networks.

BACKGROUND

Reliable connection (RC) is a well-known transport level communication protocol that allows reliable transfer of data between network elements. An example RC implementation is described in U.S. Pat. No. 7,593,996, which provides a technique for establishing reliable peer-to-peer communication among storage system "partners" arranged in a clustered environment.

Dynamic Connection (DC) is a transport service allowing efficient communication between network elements. DC Background information can be found, for example, in U.S. Pat. No. 8,761,189, which describes a method for communication, including allocating, in a network interface controller (NIC), a single DC initiator context for serving requests from an initiator process running on the initiator host, and transmitting data to multiple target processes running on one or more target nodes.

Remote Direct Memory Access (RDMA) is a technique that allows direct memory access from the memory of one computer into that of another without involving either one's operating system. RDMA is described, for example, in "Mellanox RDMA Aware Networks Programming User Manual," Rev. 1.7 (2015).

SUMMARY

An embodiment of the present invention that is described herein provides an apparatus including a network interface and circuitry. The network interface is configured to connect to a communication network. The circuitry is configured to receive, from a host, first Remote Direct Memory Access (RDMA) requests in accordance with a first transport service type, for transfer of data between an initiator process that runs on the host and one or more responder processes that run on one or more remote computers, to convert the first RDMA requests into second RDMA requests in accordance with a second transport service type that is different from the first transport service type, to communicate messages corresponding to the second transport service type with the one or more remote computers, to convert completions, which are received from the one or more remote computers in accordance with the second transport service type, into corresponding completions to the first RDMA requests in accordance with the first transport service type, and to send the corresponding completions to the initiator process in the host.

In some embodiments, the first transport service type is a reliably-connected (RC) transport service, in which a dedicated channel with each remote computer is formed by associating a dedicated QP with a peer dedicated QP in the remote computer. In an embodiment, the requests include verbs of the RC transport service.

In some embodiments, the second transport service type is a dynamically-connected (DC) transport service, which allows a queue-pair (QP) corresponding to the initiator process to reach multiple target processes. In an embodiment, the circuitry is configured to send, responsively to the requests, a connect packet directed to a responder process in the one or more remote computers, so as to open a dynamic connection with the responder process. In an embodiment, the circuitry is configured to receive, in response to the connect packet, an acknowledgment packet containing a session identifier (ID). In an embodiment, the circuitry is configured to transmit, in response to receiving the acknowledgment packet, one or more data packets containing the session ID, via the communication network over the dynamic connection to the responder process. In a disclosed embodiment, the host interface is configured to close the dynamic connection with the responder process responsively to a preset connection-closure criterion.

In another embodiment, the circuitry includes offloading hardware that is configured to perform one or both of (i) conversion of the first RDMA requests into the second RDMA requests, and (ii) conversion of the completions from the second transport service type into the first transport service type. In yet another embodiment, the circuitry is configured to allocate computing and memory resources to the Initiator process. In still another embodiment, the circuitry is configured to schedule communication of the messages corresponding to the second transport service type in accordance with a preset priority scheme. In an example embodiment, the circuitry is configured to maintain a queue of pending messages of the second transport service type, and to send the pending messages grouped by the responder processes.

There is additionally provided, in accordance with an embodiment of the present invention, a method including receiving, from a host, first Remote Direct Memory Access (RDMA) requests in accordance with a first transport service type, for transfer of data between an initiator process that runs on the host and one or more responder processes that run on one or more remote computers. The first RDMA requests are converted into second RDMA requests in accordance with a second transport service type that is different from the first transport service type. Messages corresponding to the second transport service type are communicated with the one or more remote computers. Completions, which are received from the one or more remote computers in accordance with the second transport service type, are converted into corresponding completions to the first RDMA requests in accordance with the first transport service type. The corresponding completions are sent to the initiator process in the host.

The present invention will be more fully understood from the following detailed description of the embodiments thereof, taken together with the drawings in which:

DETAILED DESCRIPTION OF EMBODIMENTS

Overview

Figure 1:
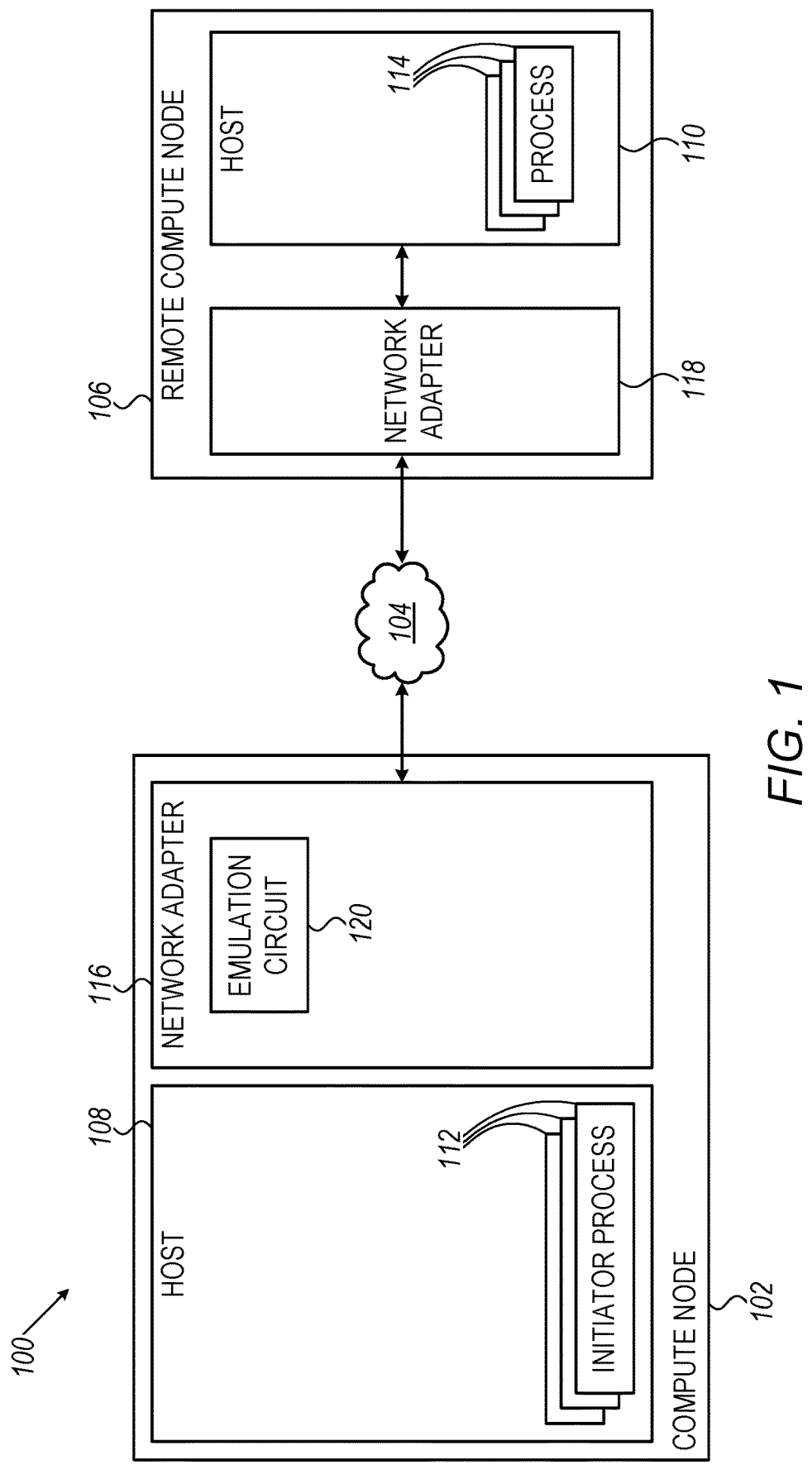
FIG. 1 is a block diagram that schematically illustrates two network nodes which reliably exchange data using RC over DC emulation, in accordance with an embodiment of the present invention.

Embodiments of the present invention that are described herein provide methods and system for emulating Remote-Direct-Memory-Access (RDMA) transactions of one transport service type, using RDMA transactions of a different transport service type (although the disclosed embodiments describe RDMA emulation, other suitable service types, such as Non-Volatile-Memory Express over Fabric (NVM-f) may be emulated in alternative embodiments).

In the description below we will refer mainly to the emulation of Reliable-Connection (RC) Remote-Direct-Memory-Access (RDMA) transactions, over an InfiniBand™ (IB) network. The disclosed techniques are, however, not limited to the emulation of an RC protocol; in some embodiments other types of protocols (e.g., Unreliable Datagram Protocol (UDP)) may be emulated. Nor is the present invention limited to IB—for example, in some embodiments Ethernet (e.g. RDMA over Convergent Ethernet, (RoCE)) may be used.

IB defines both a layered hardware protocol (physical, link, network, and transport layers) and a software layer, which manages initialization and communication between devices. The transport layer is responsible for in-order packet delivery, partitioning, channel multiplexing and transport services, as well as data segmentation when sending and reassembly when receiving.

InfiniBand specifies an RC and an Extended RC (XRC) transport services. RC provides reliable transfer of data between two network entities, referred to as a requester and a responder. As a connection oriented transport, RC requires a dedicated queue pair (QP) for each pair of requester and responder processes.

XRC, (described, for instance, in "Supplement to Infini-Band™ Architecture Specification Volume 1.2.1, Annex A14: Extended Reliable Connected (XRC) Transport Service", 2009, Revision 1.0), enables a shared receive queue (SRQ) to be shared among multiple processes running on a given host. As a result, each process can maintain a single send QP to each host rather than to each remote process. A receive QP is established per remote send QP and can be shared among all the processes on the host.

RC and XRC are safe and easy to use; consequently, many applications that utilize RC and XRC services have been written. However, RC establishes connections with all possible targets prior to the transmission of data, and, as such, may allocate a large amount of system resources (such as memory and queue management hardware). (XRC typically requires less resources than RC, but the amount may still be large enough to significantly degrade the application performance.)

Dynamic Connected (DC) is another transport layer service, in which a single context of an initiator process running in a host serves multiple data transmit requests from the initiator process to multiple target processes running on one or more target processes, which may run on other hosts. The main benefit of DC is that resources are allocated when needed, and connections may be "destroyed" when not used. Thus, DC typically requires significantly less resources than RC.

In the Ethernet world, RoCE provides RDMA services to both DC and RC transports; when RC transports are serviced, a large amount of resources is needed, but programming is relatively simple.

In summary, RC is easy to use at the cost of scalability; DC is scalable, but DC programming is complex.

Some embodiments according to the present invention provide for systems and methods that emulate RC transports using DC transports, transparently to the user. In some embodiments, a network adapter comprises emulation circuitry that receives RC RDMA requests from a host, translates the requests to corresponding DC RDMA requests, receives DC RDMA completions, translates the DC RDMA completions to corresponding RC RDMA completions, and sends the RC RDMA completions to the host. In an embodiment, the emulation circuitry comprises a DC requests queue and/or a DC Completions queue. In some embodiments, requests from the DC request queue are posted responsively to the connections that the requests require (e.g., the source process and the target process IDs), so as to lower the number of concurrently open connections (and the associated resources).

Thus, in embodiments, legacy applications that use RDMA transports may run on a host and communicate with remote process using RDMA RC transports. Emulation circuitry, typically in the network adapter, converts the communication to DC transports, transparently to the legacy applications.

More details will be disclosed in the System Description hereinbelow, with reference to example embodiments.

System Description

FIG. 1 is a block diagram that schematically illustrates two network nodes which reliably exchange data using RC over DC emulation, in accordance with an embodiment of the present invention. A Compute Node 102 exchanges data with a remote compute node 106 over a network 104 (e.g., InfiniBand™ (IB)), using DC RDMA transports that emulate RC requests. The RC requests are initiated by a Host 108 of Compute Node 102, and targeted at a Host 110 of remote compute node 106 (Host 110 will be sometimes referred to a Remote Computer). Compute Node 102 comprises, in addition to host 108, a Network Adapter 102, such as a Network Interface Controller or a Host Channel Adapter (HCA), which communicates with the network on behalf of host 108. Likewise, Remote Compute Node 106 comprises, in addition to host 110, a Network Adapter 118, which communicates with the network on behalf of host 110.

According to the example embodiment illustrated in FIG. 1, one or more initiator processes 112 that run in Host 108 may wish to exchange data with one or more target processes 114 that run on host 110 in Remote Compute Node 106. In other embodiments, initiator processes 112 may wish to exchange data with a single target process running in host 110, with multiple target processes that run in multiple hosts in Remote Compute Node 106, or, with multiple target processes that run in multiple remote hosts. We will refer to all such target processes as Remote Target Processes or Remote Processes, for brevity.

Host 108 may send RDMA requests to Network Adapter 116. The RDMA requests may indicate that one or more initiator processes 112 wishes to exchange data with one or more remote processes 114, using, for example, RDMA-RC protocol.

Network Adapter 116 comprises an Emulation Circuit 120, which is configured to convert the RC RDMA requests that Host 108 sends into DC RDMA transactions, that require less resources than RC based transactions. Network Adapter 116 is configured to send DC transports that Emulation Circuit 120 generates, over Network 104, to target processes 114. Network Adapter 116 is further configured to receive DC RDMA completions form the network and send the completions to Emulation Circuit 120, which is further configured to convert the DC RDMA completions into RC RDMA completions, and send the RC RDMA completions to Host 108. (The embodiments described herein refer mainly to "completions" as is common in Infiniband terminology. Generally, completions may also be referred to as responses.)

Using this technique, application software running on a local host may use well established RC RDMA transactions to communicate with remote processes running in remote hosts; emulation circuitry converts RC requests into the resource efficient DC protocol; the Network Adapter sends and receives DC transports, and the Emulation Circuitry converts the DC completions into RC completions, which are then returned to the host.

As would be appreciated, Network Adapter 102 illustrated in FIG. 1 and described hereinabove is shown by way of example. In alternative embodiments, for example, Emulation Circuit 120 or parts thereof may be implemented in the host, using hardware, using software, or using a combination of hardware and software. In another embodiment Emulation Circuit 120 or parts thereof may be embodied in an additional circuit (not shown); for example, the emulation circuit may be integrated in a graphic acceleration board or Graphics Processing Unit (GPU). In some embodiments, Compute Node 102 may comprise a plurality of hosts, of the same or of different types, and/or a plurality of network adapters; in an embodiment a single emulation circuit may serve a plurality of network adapters.

Figure 2:
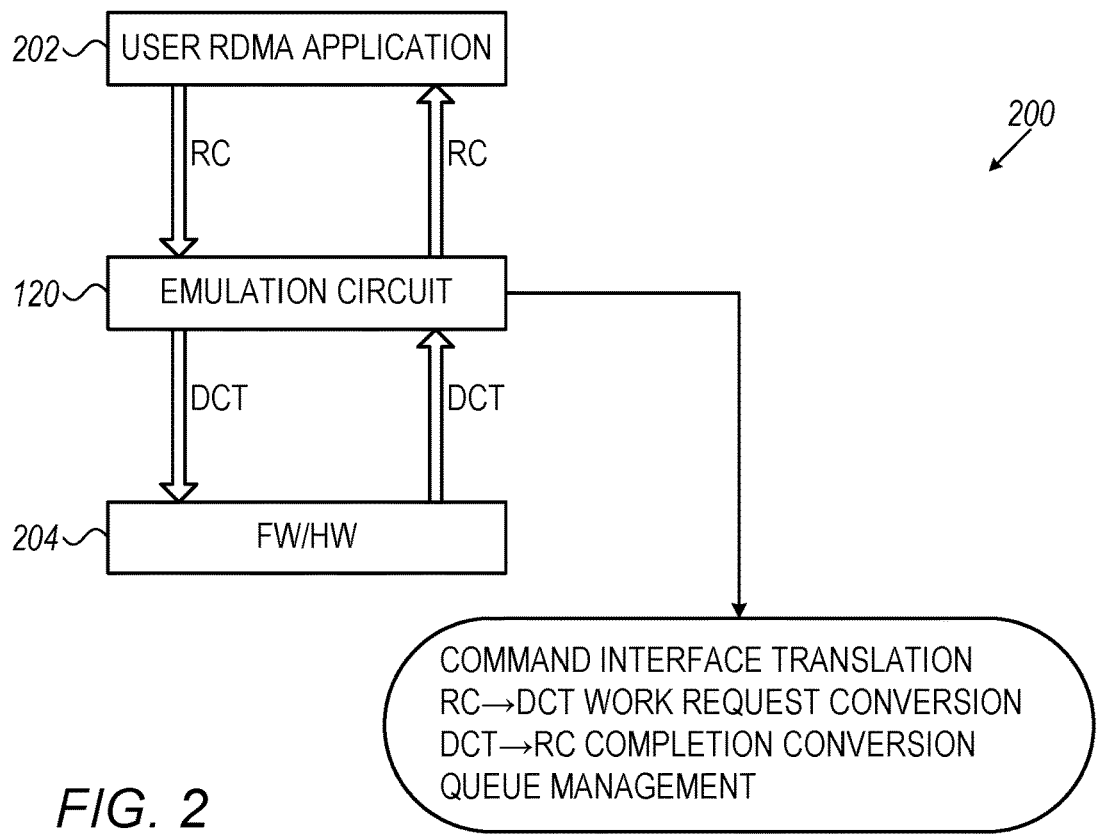
FIG. 2 is a block diagram that schematically illustrates an RDMA emulation structure, in accordance with an embodiment of the present invention.

FIG. 2 is a block diagram 200 that schematically illustrates an RDMA emulation structure, in accordance with an embodiment of the present invention. this structure can be used, for example, in compute node 102. In the present example, user RDMA Applications 202 (e.g. RC RDMA applications), which run on Host 108 (FIG. 1), send requests to Emulation Circuit 120 in Network Adapter 116 (FIG. 1). According to the example embodiment illustrated in FIG. 2, the RDMA requests that the RDMA applications send to the Emulation Circuit are RC RDMA requests.

Emulation Circuit 120 converts the RC RDMA requests to corresponding DC Transports (DCTs), and sends the DCTs to a Firmware-Hardware (FW/HW) unit 204. In an embodiment, FW/HW unit 204 is in Network Adapter 116 (FIG. 1), and may comprise a processor and/or hardware circuitry. FW/HW unit 204 is configured to convert the DCTs to packets, send the packets over the network to remote processes 114 (FIG. 1), receive completion packets from the Remote Processes, convert the completion packets to DCT completions and send the DCT completions to the Emulation Circuit, which then converts the DCT completions to corresponding RC RDMA completions and sends the completions to the User RDMA Application.

According to the example embodiment illustrated in FIG. 2, the Emulation Circuit is configured to execute:
Command Interface Translation, for user commands;
RC work-request to DC work request conversion;
DCT to RC Completion conversion;
Management of the associated work-queues and completion-queues.

Thus, a user may run RDMA applications on the host, including, for example, Message-Passing Interface (MPI) implementations, Storage Performance Development Kit (SPDK) and others. The network adapter emulates the RC RDMA transactions using DC RDMA transactions, transparently to the user.

As would be appreciated, the RDMA emulation structure illustrated in FIG. 2 and described hereinabove is cited by way of example. In alternative embodiments, for example, parts of the Emulation Circuit functions described hereinabove may be done by software running on the host and/or by the FW/HW circuit. Similarly, part of the HW/SW functionality may be done by the Emulation Circuit.

Figure 3:
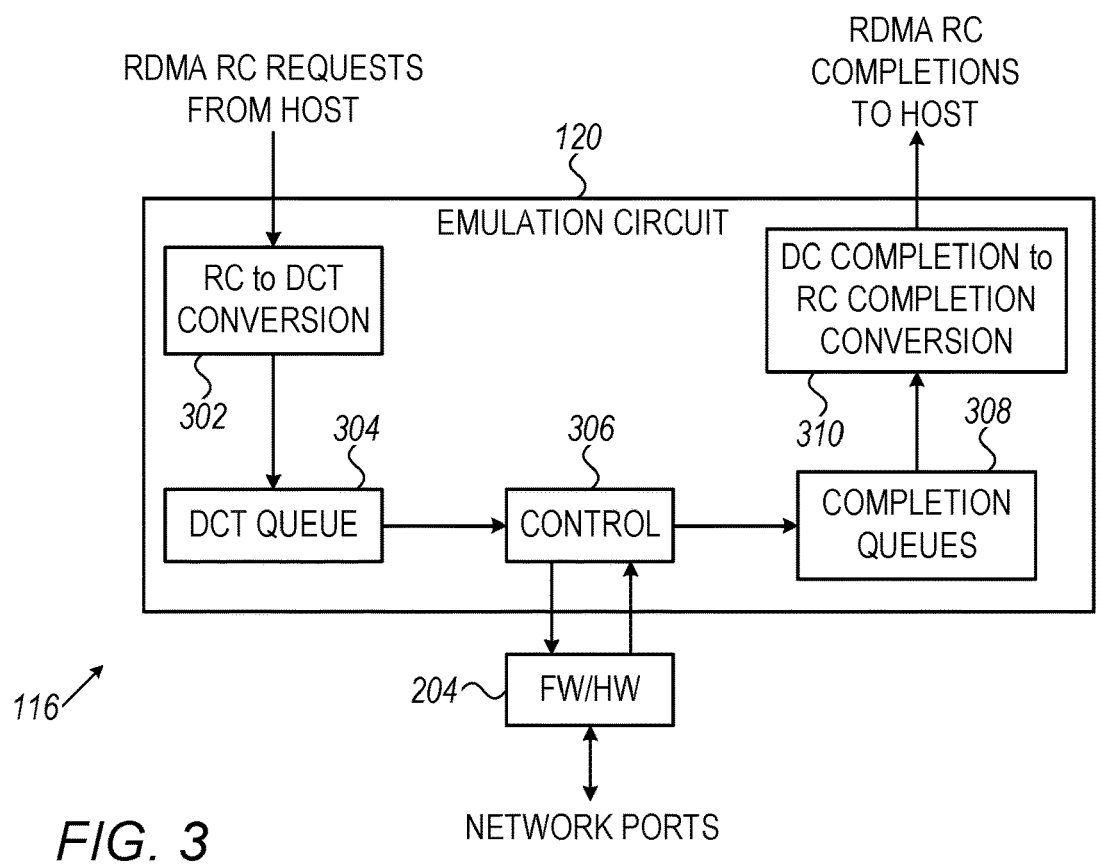
FIG. 3 is a block diagram that schematically illustrates the structure of a Network Adapter, in accordance with an embodiment of the present invention.

FIG. 3 is a block diagram that schematically illustrates the structure of Network Adapter 116, in accordance with an embodiment of the present invention. The Network Adapter comprises Emulation Circuit 120, which is configured to communicate RDMA RC transports with Host 108 (FIG. 1) and to communicate DC transports, through a FW/HW circuit 204, with the network. In embodiments, FW/HW 204 may also be used to communicate non-DC traffic with the network.

Emulation Circuit 120 receives RDMA RC requests from the host. An RC to DC Conversion circuit 302 translates the RC requests to corresponding DC work requests, and sends the DC work request to a DCT Queue 304.

A Control Circuit 306 reads DC work requests from DCT Queue 304, converts the requests to corresponding network messages to Remote Processes 114 (FIG. 1) and sends the messages to FW/HW 204. FW/HW 204 converts the messages to packets (e.g., by adding headers and checksums), queues the packets and sends the packets to the network (through the network adapter ports, not shown).

Control Circuit 306 further receives, through HW/FW 204, DC send completions for messages that the sending node has sent, and DC receive completions for the messages that the remote processes have sent, and stores completion notifications in a DC Completion Queues 308. A DC-Completion-to-RC-Completion Conversion circuit 310 translates the DC completions to corresponding RC completions, and sends the completions to host 116.

As would be appreciated, the structure of Network Adapter 116 and Emulation Circuit 120 illustrated in FIG. 3 and described hereinabove are cited by way of example. In alternative embodiments, for example, the completions queue may store converted completions and, hence, DC Completion-to-RC-Completion Conversion circuit 310 may be coupled to Control Circuit 306, sending converted completions to queue 308. In an embodiment, there is a completion queue in the FW/HW 204 rather than in the emulation circuit.

Example Method Flows

In some embodiments according to the present invention, the RC RDMA requests that the host sends to the network adapter comprise RDMA Protocol Verbs, which is an abstract interface to RDMA enabled network adapters. See, for example, RDMA Protocol Verbs Specification (Version 1.0) Hillard et. Al, April 2003.

Figure 4:
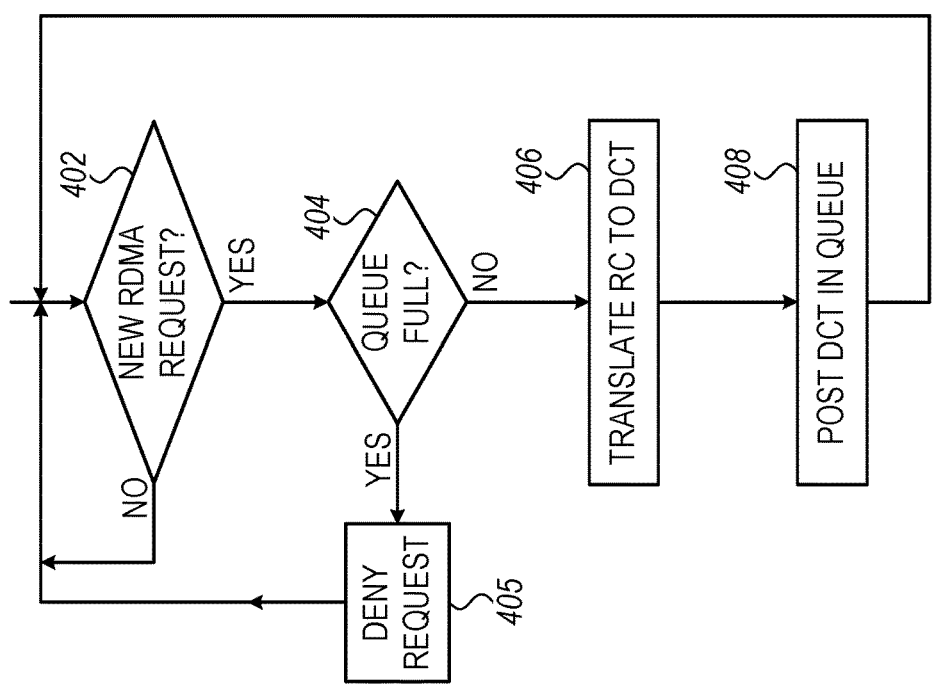
FIG. 4 is a flowchart that schematically illustrates a method for posting translated RC verbs in a DC execution queue, in accordance with an embodiment of the present invention.

FIG. 4 is a flowchart 400 that schematically illustrates a method for posting translated RC verbs in a DC execution queue, in accordance with an embodiment of the present invention. The flowchart is executed by RC to DCT Conversion circuit 302 (FIG. 3), which will be referred hereinbelow, for brevity, as RC-to-DCT.

The flowchart starts at a Check-New-RDMA-Request step 402, wherein the RC-to-DCT waits for a new RDMA request from the host. When the RC-to-DCT receives a new request from the host, the RC-to-DCT enters a Check-Queue-Full step 404, wherein the RC-to-DCT checks if DCT Queue 304 (FIG. 3) is full. If the queue is full, no new requests can be stored, and the RC-to-DCT, in a Deny-Request step 405, sends a RDMA-request-deny to the host (typically the host will submit the same request again after some delay), and then reenters step 402. If, in step 404, the queue is not full, the RC-to-DCT will enter a Translate RC to DC step 406, and translates the RC RDMA request to a corresponding DCT request. Next, in a Post-DCT-in-Queue step 408, the RC-to-DCT writes the DCT request in DCT Queue 408, and then reenters step 402.

Figure 5:
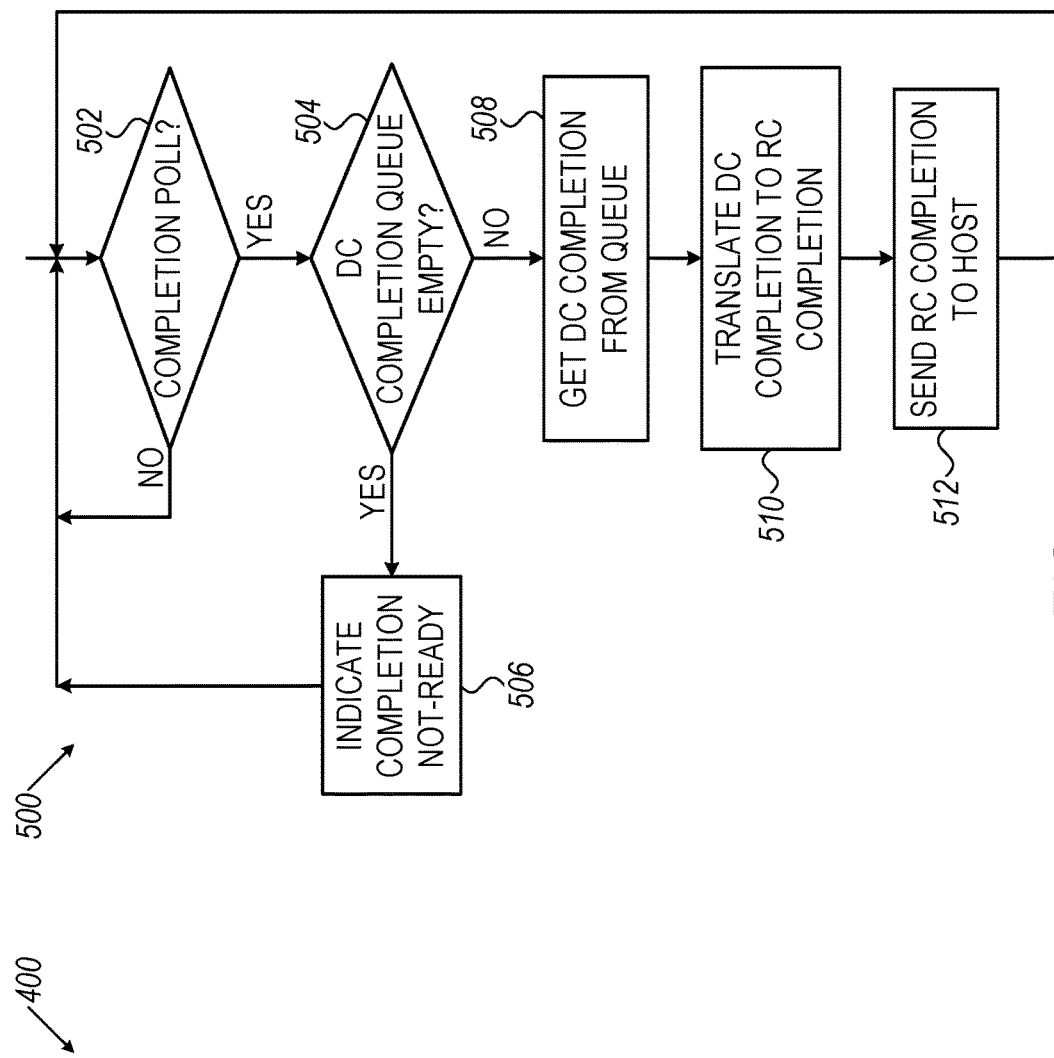
FIG. 5 is a flowchart that schematically illustrates a method for sending DC completions translated to RC completions to a host, in accordance with an embodiment of the present invention.

FIG. 5 is a flowchart 500 that schematically illustrates a method for sending DC completions translated to RC completions to a host, in accordance with an embodiment of the present invention. The flowchart is executed by DC-Completion-to-RC-completion Conversion circuit 310 (FIG. 3), which will be referred to hereinbelow, for brevity, as DCC-to-RCC.

As would be appreciated, the same or a similar flowchart may be used for sending completion messages, received when the Send has been completed, and a remote completion messages, received from the remote and remote processes.

The flow starts at a Check-Completion-Poll step 502, where the DCC-to-RCC checks if the host is polling for a new RC-DMA completion. If the host is not polling for a new completion, the DCC-to-RCC loops over step 502 until the host does poll for a new completion. When the host polls for the new completion, the DCC-to-RCC enters a Check-DC-Completions-Queue-Empty step 504, and checks if DC-Completions-Queue 308 (FIG. 3) is empty. If so, the DCC-to-RCC enters an Indicate-Completion-Not-Ready step 506, indicates to the host that no new completions has arrived, and then reenters step 502.

The DCC-to-RCC loops over steps 502, 504, 506 as long as new completion polls are received from the host and the queue is empty. When, following a completion poll, the queue is not empty, the DCC-to-RCC proceeds to a Getting-DC-Completion-From-Queue step 508, wherein the DCC-to-RCC reads the oldest DC completion from the DC-completions-Queue, and then, in a Translate-DC-Completion-to-RC Completion step 510, converts the completion to a corresponding RC completion. Next, in a Send-RC-completion step 512, the DCC-to-RCC sends the RC completion to the host, and then reenters step 502, to handle the next DC completion poll.

As would be appreciated, the flow-charts illustrated in the example embodiments of FIGS. 4, 5 and described above are cited by way of example. Other suitable flowcharts may be used in alternative embodiments. For example, in some embodiments, some or all the steps can be done in parallel; the request queue may store non-converted RC requests and, hence, step 408 may precede step 406; the completions queue may store converted completions and, hence, step 506 may not be necessary (executed before the completions queue is written). In an embodiment, there is a completion queue in the FW/HW 204 rather than in the emulation circuit.

In some embodiment, the host does not poll for completions; instead, when a completion arrives, the emulation circuit sends a corresponding RC completion to the host, and flowchart 500 changes accordingly.

Figure 6:
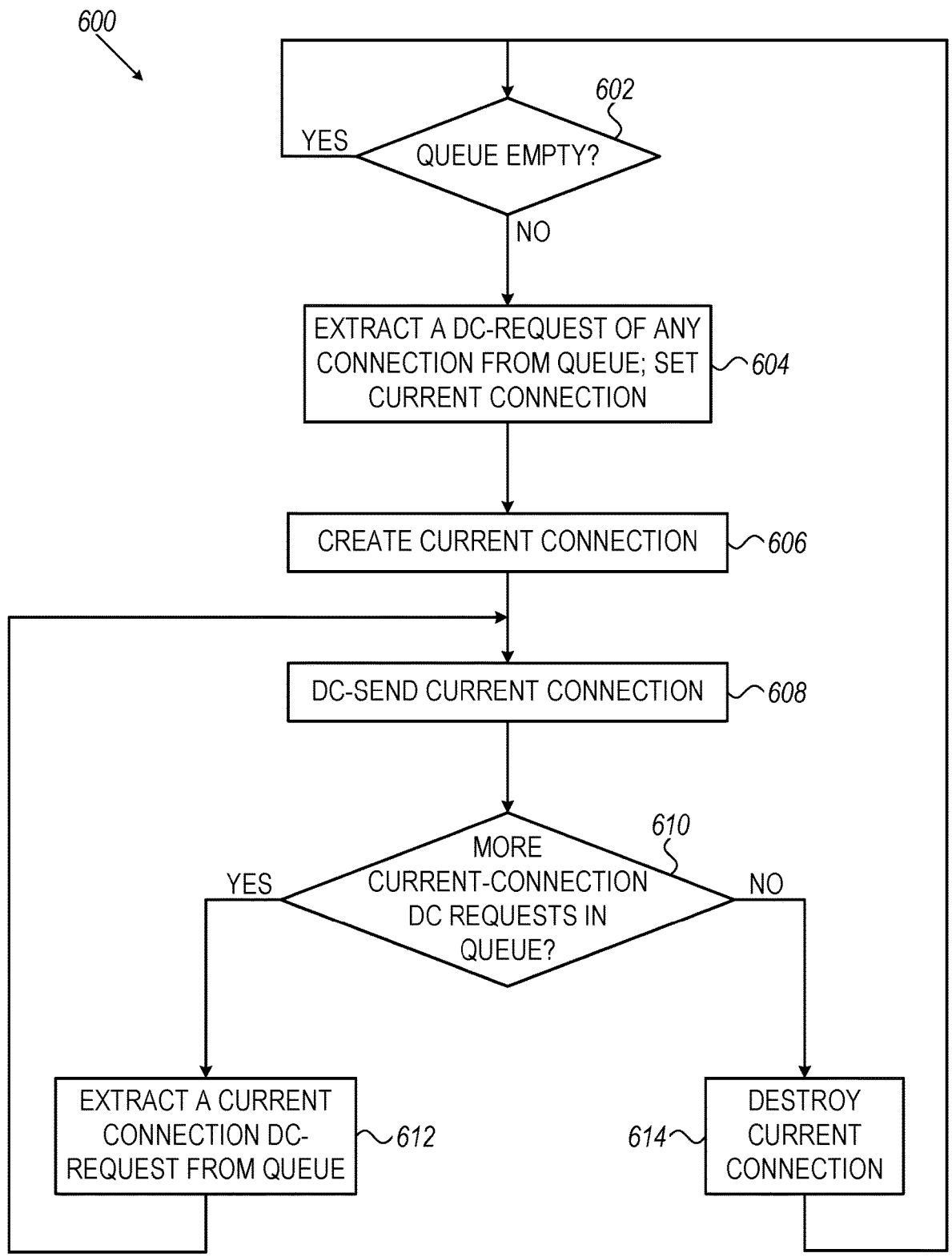
FIG. 6 is a flowchart that schematically illustrates a method for managing a queue of translated DC requests, in accordance with an embodiment of the present invention.

FIG. 6 is a flowchart 600 that schematically illustrates a method for managing a queue of translated DC requests, in accordance with an embodiment of the present invention. The flowchart is executed by Emulation Circuit 120 (FIG. 2).

According to the example embodiment illustrated in FIG. 6, DC transports for which a connection already exist get higher priority than DC transport that require the establishing of new connections. This policy may lead to a reduced number of concurrently open connections and, hence, better resource utilization.

The flowchart starts at a Check-Queue-Empty Step 602, wherein the Emulation Circuit checks if the queue is empty. If so, the Emulation Circuit will stay at step 602 until the queue is not empty (e.g., a new DC request has been written into the queue, by RC-to-DC Conversion Circuit 302 (FIG. 3)). If, in step 602, the queue is not empty, the Emulation Circuit enters an Extract-DC-Request-Any-Connection step 604, extracts a DC request from the queue and sets a CONNECTION variable to the connection indicated by the DC request (we will sometimes refer hereinbelow to the connection stored in the CONNECTION variable as "the current connection"). In an embodiment, the selected DC request is the least recently written queue entry; in other embodiments, the entry may be selected according to a priority scheme based on attributes of the request, and in yet other embodiments a selection measure may be used, respective, for example, to a priority of the request, to the elapsed time since the request entered the queue and to other criteria (the selected request, however, is typically the least recent entry of all same-connection requests).

The Emulation Circuit next enters a Connect step 608, and creates a DC connection to the current target process (which was specified when the emulated RC queue-pair was created); and, then, in a DC-SEND step 608, sends the DC request to over the current connection.

To lower the number of concurrently open connections, the Emulation Circuit next, at a Check-Current-Connection-Requests step 610, checks if there are more DC requests in the queue using the current connection (e.g., requests with a connection field that is equal to the CONNECTION variable). If so, the Emulation Circuit, in an Extract-DC-Request-Same-Connection step 612, reads another DC request that uses the current connection from the queue (in an embodiment, if there is more than one current-connection request, the Emulation Circuit will select the least recent request). After step 612, the Emulation Circuit will reenter step 608, and send the extracted DC request using the target connection.

If, in step 610, there are no more DC requests using the current connection, the Emulation Circuit enters a Destroy-Connection step 614, and "destroys" the connection to the target process. This operation releases resources, which can be re-allocated to new connections. After step 614 the Emulation Circuit reenters step 602, to get new DC requests that typically use other connections.

As would be appreciated, the flow-chart illustrated in the example embodiment of FIG. 6 and described above is cited by way of example. Other suitable flowcharts may be used in alternative embodiments. For example, in some embodiments the emulation circuit may limit the number of consecutive DC-send to over the same, to avoid "starvation" of other connections. In some embodiments, the Emulation Circuit is configured to destroy connections after a preset time with no activity has elapsed; in an embodiment, high priority connections are destroyed after a preset time interval with no activity, whereas lower priority connections are destroyed when there are no more same-connection requests in the queue. In another embodiment, the decision whether to destroy a connection is taken respective to the amount of used resources; and, in yet other embodiments, a connection is destroyed based on a destroy measure, which is calculated respective to the existence of more same-connection requests in the queue, the priority of the connection, the elapsed time since the last DC activity in which the connection was used, and, the amount of resources that are used for the DC connections.

In some embodiments, a preset number of queue-pairs is used for connections with remote processes; when a send request is received, the emulation circuit first checks if the request connection fits any of the existing queue-pairs. If so, the request is executed; if no queue-pair fits the requested connection, the request waits until one of the existing queue-pairs becomes idle.

In step 610, the Emulation Circuit may read the entire queue, searching for requests to the current target. In some embodiments, a hash table may be used to accelerate the search. In an embodiment, a Content-Addressable Memory (CAM) may be used, to concurrently search all queue entries for an entry to the current target process.

The configuration of Network Adapter 116 and its components, e.g., Emulation Circuit 120, and the methods of flowcharts 400, 500 and 600, illustrated in FIGS. 1 through 6, are example configurations and flowcharts that are depicted purely for the sake of conceptual clarity. Any other suitable configurations and flowcharts can be used in alternative embodiments. The network adapter and components thereof may be implemented using suitable hardware, such as in one or more Application-Specific Integrated Circuit (ASIC) or Field-Programmable Gate Arrays (FPGA), using software, using hardware, or using a combination of hardware and software elements.

In some embodiments, certain elements of network adapter 116, e.g., Control Circuit 306 and/or FW/HW 204 may be implemented using one or more general-purpose programmable processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory. In an embodiment, Control Circuit 306 may comprise logic circuits that offload some or all the processing that the processors execute.

Although the embodiments described herein mainly address emulation of RDMA transports using DC transports, the methods and systems described herein can also be used in other applications, such as in Reliable Datagram (RD) emulation over DC.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. An apparatus, comprising:
a network interface, configured to connect to a communication network; and
circuitry, which is configured to:
receive, from a host, first Remote Direct Memory Access (RDMA) requests in accordance with a first transport service type, for transfer of data between an initiator process that runs on the host and one or more responder processes that run on one or more remote computers;
convert the first RDMA requests into second RDMA requests in accordance with a second transport service type that is different from the first transport service type;
communicate messages corresponding to the second transport service type with the one or more remote computers;
convert completions, which are received from the one or more remote computers in accordance with the second transport service type, into corresponding completions to the first RDMA requests in accordance with the first transport service type; and
send the corresponding completions to the initiator process in the host.

2. The apparatus according to claim 1, wherein the first transport service type is a reliably-connected (RC) transport service, in which a dedicated channel with each remote computer is formed by associating a dedicated queue-pair (QP) with a peer dedicated QP in the remote computer.

3. The apparatus according to claim 2, wherein the requests comprise verbs of the RC transport service.

4. The apparatus according to claim 1, wherein the second transport service type is a dynamically-connected (DC) transport service, which allows a queue-pair (QP) corresponding to the initiator process to reach multiple target processes.

5. The apparatus according to claim 4, wherein the circuitry is configured to open a dynamic connection with a responder process in the one or more remote computers, by sending, responsively to the requests, a connect packet directed to the responder process.

6. The apparatus according to claim 5, wherein the circuitry is configured to receive, in response to the connect packet, an acknowledgment packet containing a session identifier (ID).

7. The apparatus according to claim 6, wherein the circuitry is configured to transmit, in response to receiving the acknowledgment packet, one or more data packets containing the session ID, via the communication network over the dynamic connection to the responder process.

8. The apparatus according to claim 5, wherein the circuitry is configured to close the dynamic connection with the responder process responsively to a preset connection-closure criterion.

9. The apparatus according to claim 1, wherein the circuitry comprises offloading hardware that is configured to perform one or both of (i) conversion of the first RDMA requests into the second RDMA requests, and (ii) conversion of the completions from the second transport service type into the first transport service type.

10. The apparatus according to claim 1, wherein the circuitry is configured to allocate computing and memory resources to the Initiator process.

11. The apparatus according to claim 1, wherein the circuitry is configured to schedule communication of the messages corresponding to the second transport service type in accordance with a preset priority scheme.

12. The apparatus according to claim 1, wherein the circuitry is configured to maintain a queue of pending messages of the second transport service type, and to send the pending messages grouped by the responder processes.

13. A method, comprising:
- receiving, from a host, first Remote Direct Memory Access (RDMA) requests in accordance with a first transport service type, for transfer of data between an initiator process that runs on the host and one or more responder processes that run on one or more remote computers;
- converting the first RDMA requests into second RDMA requests in accordance with a second transport service type that is different from the first transport service type;
- communicating messages corresponding to the second transport service type with the one or more remote computers;
- converting completions, which are received from the one or more remote computers in accordance with the second transport service type, into corresponding completions to the first RDMA requests in accordance with the first transport service type; and
- sending the corresponding completions to the initiator process in the host.

14. The method according to claim 13, wherein the first transport service type is a reliably-connected (RC) transport service, in which a dedicated channel with each remote computer is formed by associating a dedicated QP with a peer dedicated queue-pair (QP) in the remote computer.

15. The method according to claim 14, wherein the requests comprise verbs of the RC transport service.

16. The method according to claim 13, wherein the second transport service type is a dynamically-connected (DC) transport service, which allows a queue-pair (QP) corresponding to the initiator process to reach multiple target processes.

17. The method according to claim 16, wherein converting the first RDMA requests into the second RDMA requests comprises open a dynamic connection with a responder process in the one or more remote computers, by sending, responsively to the requests, a connect packet directed to the responder process.

18. The method according to claim 17, wherein converting the first RDMA requests into the second RDMA requests comprises receiving, in response to the connect packet, an acknowledgment packet containing a session identifier (ID).

19. The method according to claim 18, wherein converting the first RDMA requests into the second RDMA requests comprises transmitting, in response to receiving the acknowledgment packet, one or more data packets containing the session ID, via the communication network over the dynamic connection to the responder process.

20. The method according to claim 17, and comprising closing the dynamic connection with the responder process responsively to a preset connection-closure criterion.

21. The method according to claim 13, and comprising scheduling communication of the messages corresponding to the second transport service type in accordance with a preset priority scheme.

22. The method according to claim 13, and comprising maintaining a queue of pending messages of the second transport service type, and sending the pending messages grouped by the responder processes.

\* \* \* \* \*